United States Patent
Abuelsaad et al.

(10) Patent No.: US 8,448,258 B2
(45) Date of Patent: May 21, 2013

(54) SECURITY CLASSIFICATION BASED ON USER INTERACTION

(75) Inventors: Tamer E. Abuelsaad, Poughkeepsie, NY (US); John H. Handy-Bosma, Cedar Park, TX (US); Yael Ravin, Mount Kisco, NY (US); William D. Morrison, Old Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 13/016,677

(22) Filed: Jan. 28, 2011

(65) Prior Publication Data

US 2012/0198564 A1    Aug. 2, 2012

(51) Int. Cl.
    *H04L 12/00* (2006.01)
(52) U.S. Cl.
    USPC ............ 726/28; 726/2; 726/3; 726/4; 726/27
(58) Field of Classification Search
    None
    See application file for complete search history.

(56) References Cited

U.S. PATENT DOCUMENTS

| | | | |
|---|---|---|---|
| 6,289,462 B1 * | 9/2001 | McNabb et al. | 726/21 |
| 6,408,336 B1 * | 6/2002 | Schneider et al. | 709/229 |
| 7,072,886 B2 * | 7/2006 | Salmenkaita et al. | 1/1 |
| 7,272,850 B2 * | 9/2007 | Bosma et al. | 726/2 |
| 7,685,645 B2 | 3/2010 | Doyle et al. | |
| 7,847,694 B2 * | 12/2010 | Lee et al. | 340/572.1 |
| 2002/0174369 A1 * | 11/2002 | Miyazaki et al. | 713/202 |
| 2003/0037261 A1 * | 2/2003 | Meffert et al. | 713/201 |
| 2003/0212909 A1 | 11/2003 | Chandrashekhar et al. | |
| 2009/0240935 A1 * | 9/2009 | Shukla | 713/100 |
| 2010/0071024 A1 | 3/2010 | Eyada | |
| 2010/0107219 A1 | 4/2010 | Thompson et al. | |
| 2011/0047628 A1 * | 2/2011 | Viars | 726/28 |

OTHER PUBLICATIONS

Gamboa, H., et al., "Prevention or Identification of Web Intrusion via Human Computer Interaction Behavior—A Proposal", Oct. 2004.
Goss, R., et al., "Enabling User Participation in Web-Based Information Security Education", 2002.
Nitsche, M., et al., "Security-relevant Challenges of Selected systems for Multi-User Interaction", 2008-2009.
Pilato-et al.; "A neural multi-agent based system for smart HTML pages retrieval"; INSPEC/IEEE Computing Soc.; pp. 233-239; 2003.

* cited by examiner

*Primary Examiner* — Peter Poltorak
(74) *Attorney, Agent, or Firm* — Cahn & Samuels, LLP

(57) ABSTRACT

An embodiment of the invention includes a method and system for content management. More specifically, the system includes a user interface for receiving content from a user and a data repository connected to the user interface for storing the content. The user interface also receives a request to access the content from the user. A program processor is connected to the data repository, wherein the program processor determines whether the content includes a security classification. A communications module is connected to the program processor, wherein the communications module sends an alert to the user interface when the content does not include a security classification. The alert includes a request to assign a security classification to the content.

22 Claims, 6 Drawing Sheets

SECURITY CLASSIFICATION BASED ON USER INTERACTION

BACKGROUND

The present invention is in the field of systems, methods, and computer program products for security classification based on user interaction.

With the increasing use of private and public computer networks, information has become more widely available to a larger number of end-users. For instance, the internet, a global network connecting millions of computers, is increasingly becoming the preferred way to disseminate information. Both commercial and non-commercial entities have recognized the growing use of computer networks and have thus accelerated the posting of electronic documents to provide access to their information.

Electronically posted documents may contain any type of information which can be electronically communicated. These documents are often posted on the World Wide Web, a system of internet-accessible web servers. Individual companies set up one or more web sites using a web server to support webpage publication and communication. The web sites can either be public or private (i.e., only accessible to company employees). Some examples of information which can be included in an electronic document such as a webpage includes data, text, facsimile, audio, video, graphics, as well as other types of information.

SUMMARY OF THE INVENTION

An embodiment of the invention includes a method and system for content management. More specifically, the system includes a user interface for receiving content from a user and a data repository connected to the user interface for storing the content. The user interface also receives a request to access the content from the user. A program processor is connected to the data repository, wherein the program processor determines whether the content includes a security classification. A communications module is connected to the program processor, wherein the communications module sends an alert to the user interface when the content does not include a security classification. The alert includes a request to assign a security classification to the content.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention provides a system and method for enforcing security classification at the time a user interacts with a resource (also referred to herein as a file, document, data, or content). Security classification is enforced on a per resource basis in a way that is not intrusive on the process of uploading resources to a repository. The user can upload and store his/her files; however, upon interaction with the file security classification is requested. The interaction is not restricted to an interaction between a human and a system; it can also be a system to system interaction as well. Applying security classification at the document level protects sensitive data in an organization (virtual or physical organization).

Figure 1:
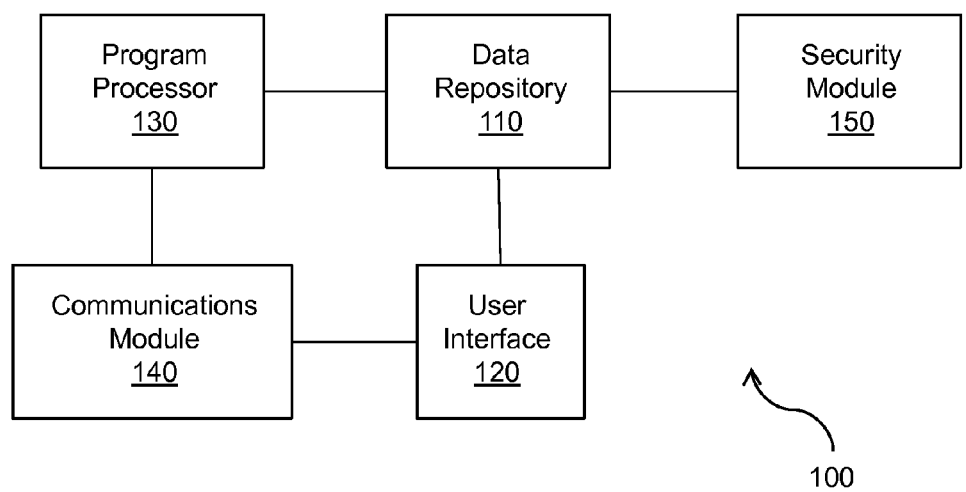
FIG. 1 illustrates a system for content management according to an embodiment of the invention.

FIG. 1 illustrates a system for content management 100 according to an embodiment of the invention, wherein the system 100 includes a data repository 110, a user interface 120, a program processor 130, a communications module 140, and a security module 150. Although FIG. 1 illustrates a particular configuration of components, the system 100 has a different configuration of components in another embodiment. For example, in another embodiment, the security module 150 is connected to the user interface 120 and/or program processor 130.

Figure 2:
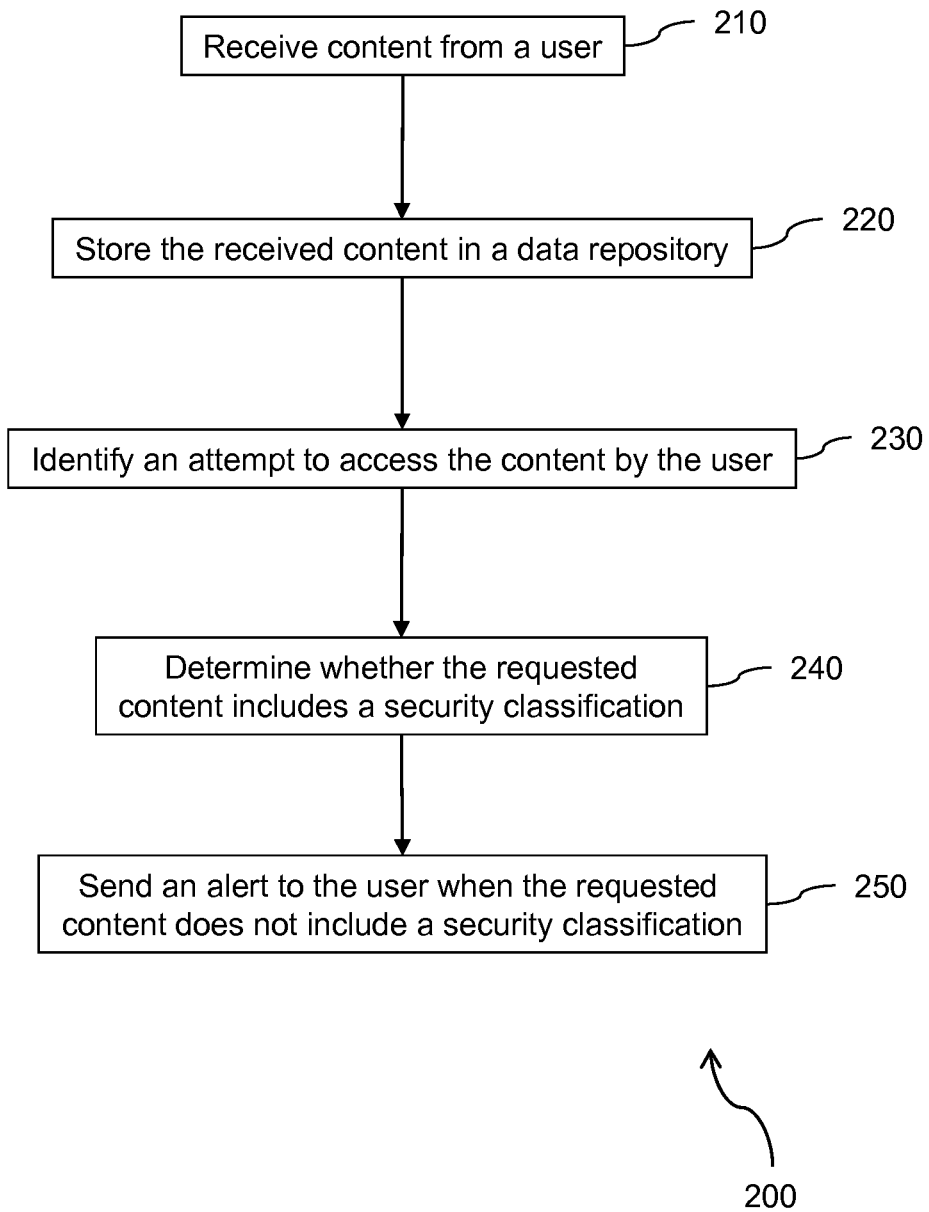
FIG. 2 is a flow diagram illustrating a method for content management according to an embodiment of the invention.

FIG. 2 is a flow diagram illustrating a method for content management 200 (e.g., using the system 100) according to an embodiment of the invention. The user interface 120 receives content (also referred to herein as a "resource") from a user (210). As used herein, the term "content" refers to documents (text, images, videos), files, records, resources, and/or webpages. The term "user", as used herein, refers to one or more individuals, entities, and/or systems that owns, authored, published, and/or posted the content.

In at least one embodiment, the user interface 120 is computer program instructions (e.g., on a server) for providing interaction with the user to allow access to the data repository 110. In another embodiment, the user interface 120 is a personal computer, laptop computer, mouse, keyboard, touch screen, cell phone, and/or tablet computer (e.g., used by the user).

For example, if the user interface 120 receives a portable document format (PDF) article from employee A of XYZ corporation, both employee A and the XYZ corporation are users. Thus, in at least one embodiment, a co-worker of employee A (e.g., employee A's supervisor and/or administrative assistant) can assign a security classification to the article. If the corporation is a user, the corporation can define individuals or groups of individuals as users (e.g., people who can publish and/or assign security classifications to content). For example, an administrator of XYZ corporation defines individuals having threshold security level, employees in the accounting and advertising departments, or all employees of XYZ corporation as users.

In at least one embodiment, the user registers with (or subsequently logs on to) the system 100 by submitting a user name and/or contact information. The user is the entity that sent the content associated with the user name and/or contact information to the user interface 120. Thus, if employee A's user name (e.g., jdoe2010) and contact information (e.g., john.doe@email.com, personal cell phone number) are not associated with the XYZ corporation, then employee A is the only user (e.g., employee A registers with FACEBOOK. COM). However, if employee A's user name (e.g., xyzmarketing) and contact information (e.g., jdoe@xyzcorp.com, marketing@xyzcorp.com, business telephone number) is associated with the XYZ corporation, then both employee A and the XYZ corporation are users.

The received content is stored in the data repository 110 (220), which is connected to the user interface 120. As used herein the term "connected" is intended to mean operationally connected, in communication with, physically connected, engaged, coupled, contacts, linked, affixed, and attached. In at least one embodiment of the invention, the data repository 110 is a searchable electronic database. In at least one embodiment, the data repository 110 includes (e.g., is resident on) one or more websites, servers, networks, and/or a cloud computing system. Thus, in one example, the content is a spreadsheet and the data repository 120 is a multi-tenant collaborative environment.

The user interface 120 identifies and/or receives a request to access the content from the user (230). As used herein, the term "access" refers to viewing, downloading, opening, clicking on, modifying, editing, appending (e.g., tagging, flagging, commenting on) and/or interacting with.

The program processor 130 is connected to the data repository 110, wherein the program processor 130 determines whether the content requested by the user includes a security classification (240). When the requested content does not include a security classification, an alert is sent to the user interface 120 (250). The alert is sent from the communications module 140, which is connected to the program processor 130. The alert is not sent to the user when the requested content includes a security classification. The alert includes an e-mail, instant message, text message, facsimile and/or telephone call requesting that the user assign a security classification to the requested content. In another embodiment, the alert includes a message notifying the user that others cannot access the requested content until a security classification is assigned to the requested content.

The security module 150 is connected to the data repository 110 and/or the user interface 120, wherein the security module 150 permits access to the content by the user when the content includes a security classification. An embodiment of the invention also permits access to the content by non-users when the content includes a security classification. As used herein, the term non-user refers to one or more individuals, entities, and/or systems that does not own and/or did not author, publish, and/or post the content (e.g., a co-worker of the user). When the content does not include a security classification, the security module 150 denies access to the requested content by the user and/or by non-users.

In at least one embodiment of the invention, when the content does not include a security classification, access to the content is denied (e.g., via the security module 150) after a threshold number of requests to access the content from the user is reached, after a threshold number of requests to access the content from non-users is reached, and/or a threshold number of requests to access the content from the user and non-users is reached. For example, when video clip V lacks a security classification, it can only be accessed 10 times. After the 10th access, further access to video clip V is denied. In another embodiment, when the content does not include a security classification, access to the content is denied after a threshold time period, e.g., the file can only be accessed for the 24 hours following storage of the file in the data repository 110. In yet another embodiment, the communications module 140 sends the user a message that a threshold number of access requests and/or a threshold time period has been reached. When the content includes a security classification, access to the content is granted.

When the content includes a security classification, one embodiment of the invention sends a message to the user, wherein the message includes a request to verify the security classification. Access to the content is denied (e.g., via the security module 150) until the security classification is verified by the user. This ensures that the content is not under or over classified. When the content does not include a security classification, the message requesting verification of a security classification is not sent to the user.

In addition, at least one embodiment of the invention includes validating an assigned security classification. Specifically, the date that the current security classification was established is compared with the date that the content was last updated. When the current security classification date is older than the content update date by a threshold value (e.g., 10 days), then the communications module 140 sends an alert to the user interface 120. In at least one embodiment, the program processor 130 automatically performs the date comparison when the request to access the content is received. In another embodiment, the program processor 130 automatically performs the date comparison at a predetermined interval (e.g., every Monday at 8:00 a.m.).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
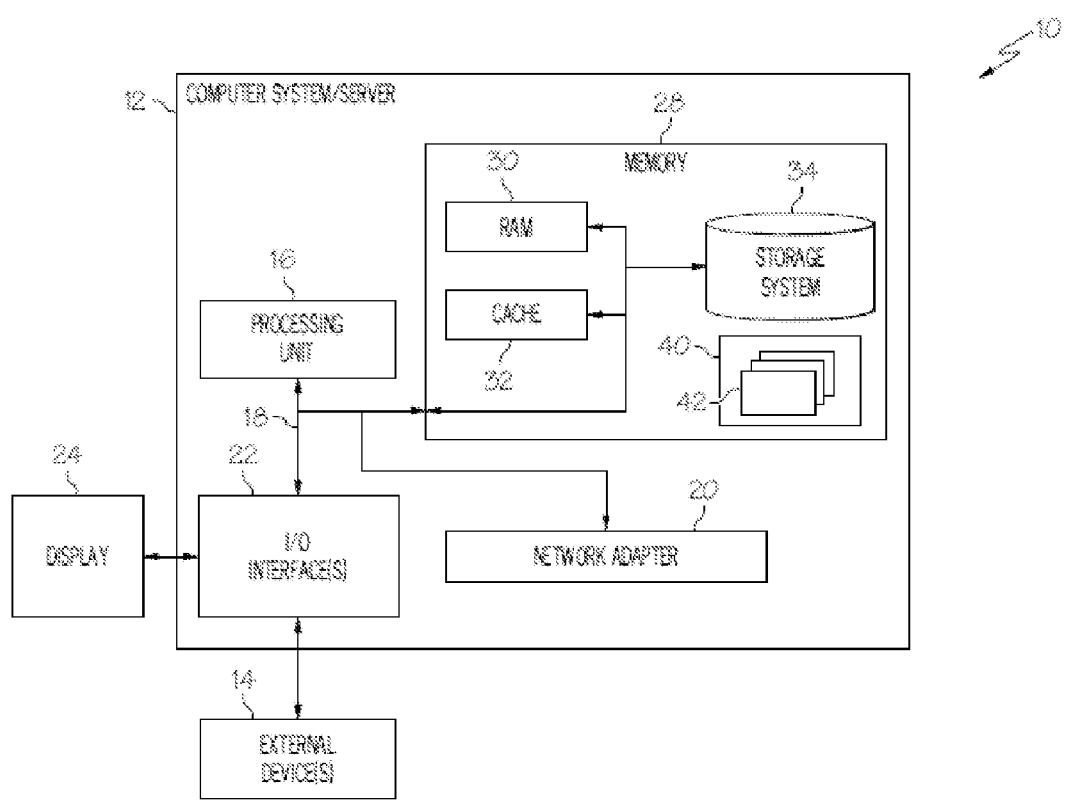
FIG. 3 depicts a cloud computing node according to an embodiment of the invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
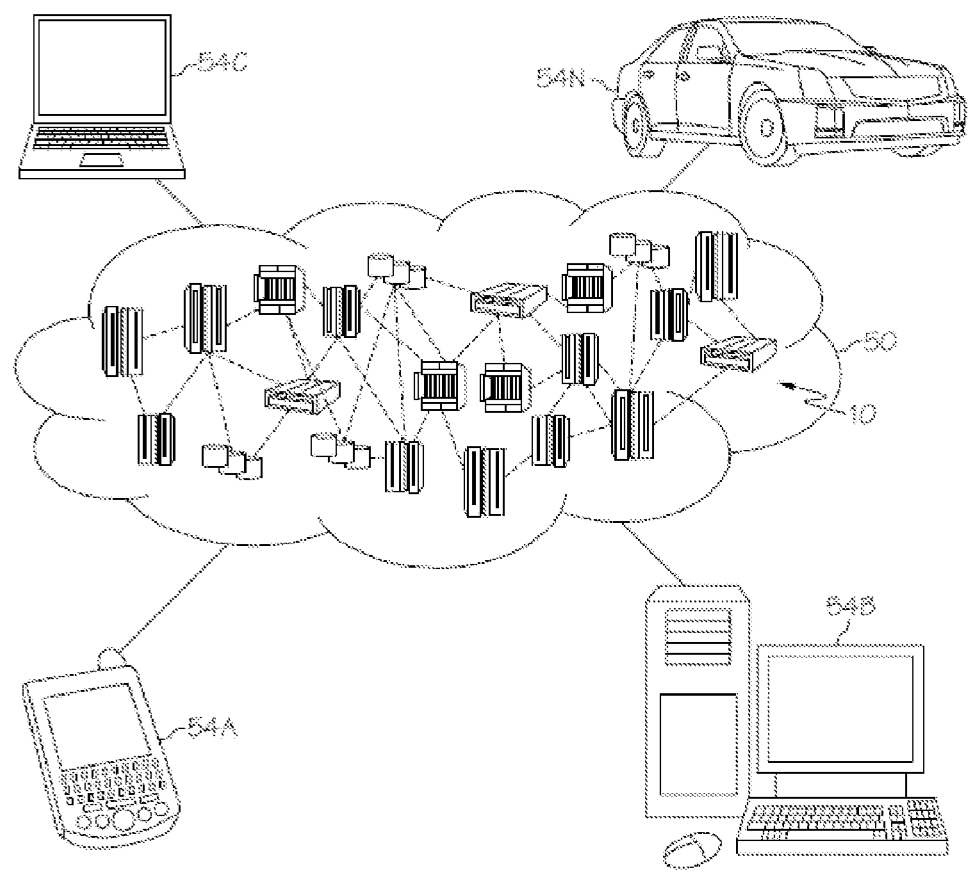
FIG. 4 depicts a cloud computing environment according to an embodiment of the invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
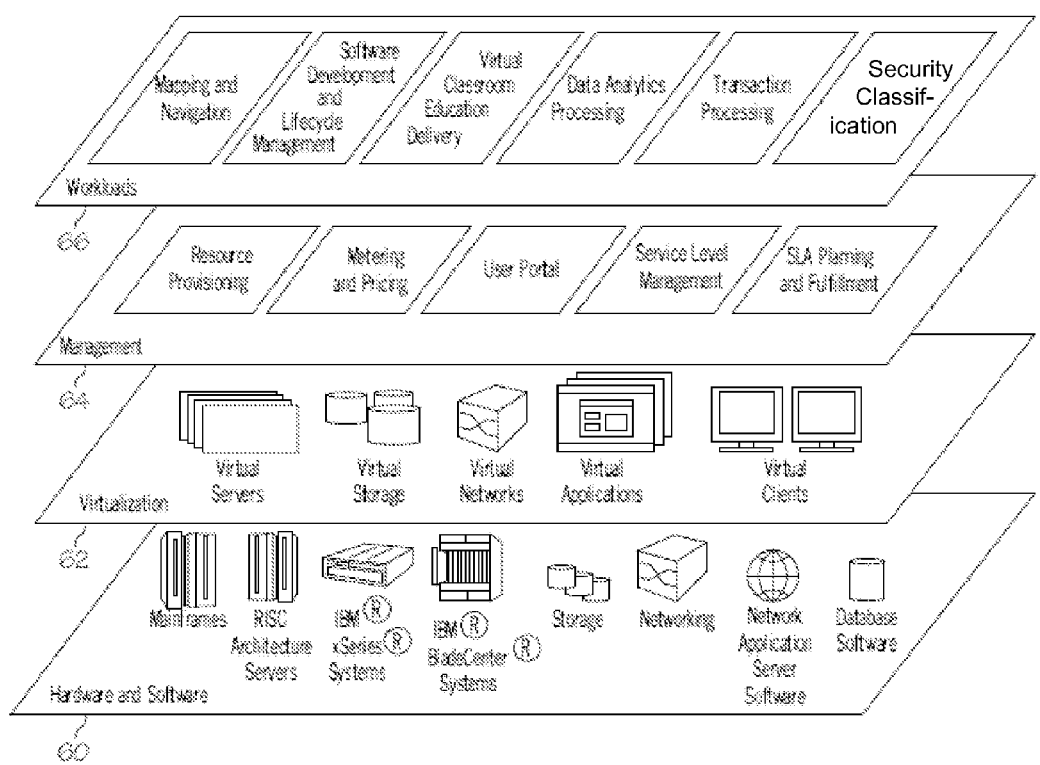
FIG. 5 depicts abstraction model layers according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and security classification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
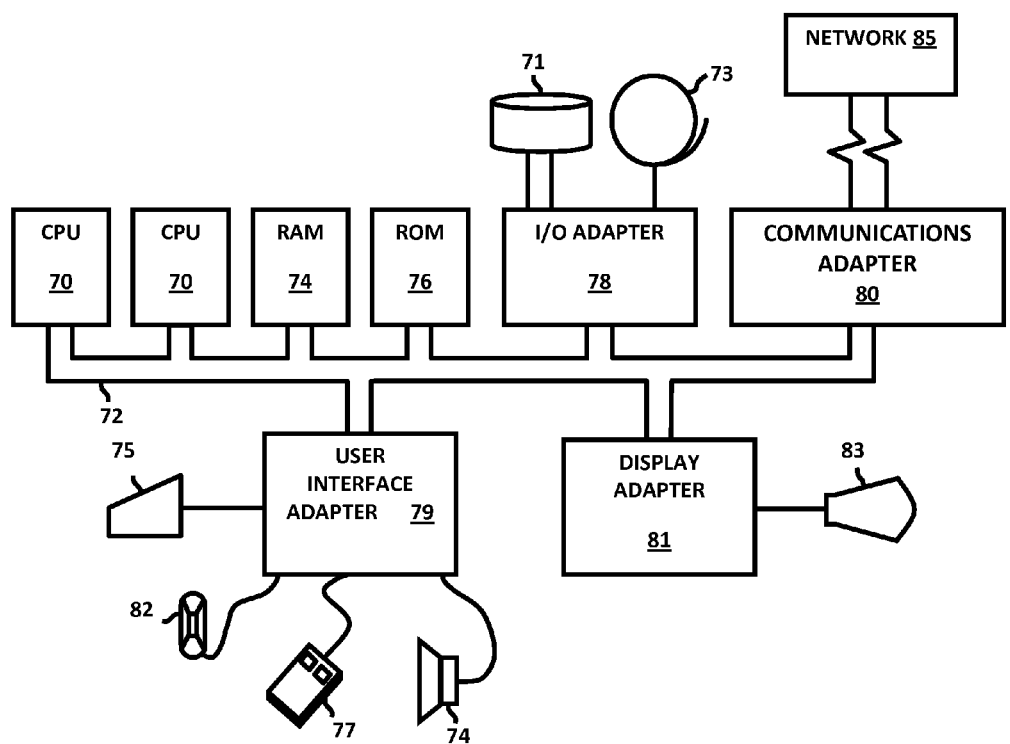
FIG. 6 illustrates a computer program product according to an embodiment of the invention.

Referring now to FIG. 6, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 70. The CPUs 70 are interconnected with system bus 72 to various devices such as a random access memory (RAM) 74, read-only memory (ROM) 76, and an input/output (I/O) adapter 78. The I/O adapter 78 can connect to peripheral devices, such as disk units 71 and tape drives 73, or other program storage devices that are readable by the system. The system can read the inventive instructions on the program storage devices and follow these instructions to execute the methodology of at least one embodiment of the invention. The system further includes a user interface adapter 79 that connects a keyboard 75, mouse 77, speaker 84, microphone 82, and/or other user interface devices such as a touch screen device (not shown) to the bus 72 to gather user input. Additionally, a communication adapter 80 connects the bus 72 to a data processing network 85, and a display adapter 81 connects the bus 72 to a display device 83 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A method for content management, including:
receiving content from a user;
storing the content in a data repository;
identifying a request to access the content from the user;

determining with a program processor whether the content includes a security classification;

sending an alert to the user with a communications module when the content does not include a security classification, the alert including a request to assign a security classification to the content; and validating an assigned security classification with the program processor, said validating including comparing a date that the assigned security classification was established with a date that the content was last updated.

2. The method according to claim 1, further including permitting access to the content when the content includes a security classification.

3. The method according to claim 2, further including, when the content does not include a security classification, at least one of:

denying access to the content by the user; and denying access to the content by non-users.

4. The method according to claim 2, further including, when the content does not include a security classification, denying access to the content after at least one of:

a threshold number of requests to access the content from the user is reached;

a threshold number of requests to access the content from non-users is reached; and a threshold number of requests to access the content from the user and non-users is reached.

5. The method according to claim 1, wherein the request to access the content from the user includes a request to modify the content.

6. The method according to claim 1, further including, in response to the request to access the content from the user, sending a message to the user when the content includes a security classification, the message including a request to verify the security classification.

7. The method according to claim 6, further including at least one of:

denying access to the content by the user until the security classification is verified by the user; and denying access to the content by non-users until the security classification is verified by the user.

8. The method according to claim 1, further including:

receiving a request to modify the content from the user after said storing of the content in the data repository; and sending to the user one of a request to assign a security classification to the content and a request to update the security classification of the content.

9. The method according to claim 1, wherein the data repository is included in a cloud computing system.

10. A method for content management, including:

receiving content from a user;

storing the content in a data repository;

identifying a request to access the content from the user;

determining with a program processor whether the content includes a security classification;

sending an alert to the user when the content does not include a security classification, the alert including a request to assign a security classification to the content;

sending a message to the user when the content includes a security classification, the message including a request to verify the security classification; and validating an assigned security classification with the program processor, said validating including comparing a date that the assigned security classification was established with a date that the content was last updated.

11. The method according to claim 10, further including:

permitting access to the content when the content includes a security classification; and when the content does not include a security classification, at least one of:

denying access to the content by the user, and denying access to the content by non-users.

12. The method according to claim 10, further including, when the content does not include a security classification, denying access to the content after at least one of:

a threshold number of requests to access the content from the user is reached;

a threshold number of requests to access the content from non-users is reached; and a threshold number of requests to access the content from the user and non-users is reached.

13. A system for content management, including:

a data repository for storing content;

a user interface connected to said data repository, said user interface receives content from a user and receives a request to access the content from the user;

a program processor connected to said data repository, said program processor determines whether the content includes a security classification and validates an assigned security classification by comparing a date that the assigned security classification was established with a date that the content was last updated; and a communications module connected to said program processor, said communications module sends an alert to said user interface when the content does not include a security classification, the alert including a request to assign a security classification to the content.

14. The system according to claim 13, further including a security module connected to said data repository, said security module permits access to the content when the content includes a security classification.

15. The system according to claim 14, wherein said security module at least one of:

denies access to the content by the user when the content does not include a security classification; and denies access to the content by non-users when the content does not include a security classification.

16. The system according to claim 14, wherein said security module, when the content does not include a security classification, denies access to the content after at least one of:

a threshold number of requests to access the content from the user is reached;

a threshold number of requests to access the content from non-users is reached; and a threshold number of requests to access the content from the user and non-users is reached.

17. The system according to claim 13, wherein the request to access the content from the user includes a request to modify the content.

18. The system according to claim 13, wherein said communications module, in response to the request to access the content from the user, sends a message to said user interface when the content includes a security classification, the message including a request to verify the security classification.

19. The system according to claim 18, further including a security module connected to said data repository, said security module at least one of:

denies access to the content by the user until the security classification is verified by the user; and denies access to the content by non-users until the security classification is verified by the user.

20. The system according to claim 13, wherein said user interface receives a request to modify the content from the user after the content is stored in said data repository, and
wherein said communications module sends a second alert to the user interface, the second alert including a request to assign a security classification to the content and a request to update the security classification of the content.

21. The system according to claim 13, wherein the data repository is included in a cloud computing system.

22. A computer program product for content management, said computer program product including:
a non-transitory computer readable storage medium;
first program instructions to receive content from a user;
second program instructions to store the received content in a data repository;
third program instructions to identify a request to access the content from the user;
fourth program instructions to determine whether the content includes a security classification;
fifth program instructions to send an alert to the user when the content does not include a security classification, the alert including a request to assign a security classification to the content; and
sixth program instructions to validate an assigned security classification, said validating including comparing a date that the assigned security classification was established with a date that the content was last updated,
said first program instructions, said second program instructions, said third program instructions, said fourth program instructions, said fifth program instructions, and said sixth program instructions are stored on said computer readable storage medium.

* * * * *